Patented Feb. 26, 1924.

1,484,784

UNITED STATES PATENT OFFICE.

GEORGE W. HEISE, OF BAYSIDE, NEW YORK, ASSIGNOR TO UNION CARBIDE & CARBON RESEARCH LABORATORIES, INC., A CORPORATION OF NEW YORK.

PROCESS OF MAKING GELATINOUS ALKALINE ELECTROLYTE AND COMPOSITIONS THEREFOR.

No Drawing. Application filed September 6, 1922. Serial No. 586,526.

*To all whom it may concern:*

Be it known that I, GEORGE W. HEISE, a citizen of the United States, residing at Bayside, in the county of Queens and State of New York, have invented certain new and useful Improvements in Processes of Making Gelatinous Alkaline Electrolyte and Compositions Therefor, of which the following is a specification.

This invention relates to the preparation of gelatinous alkaline electrolyte for galvanic cells. The principal object of the invention is to provide a dry composition, comprising alkali and a substance adapted to gelatinize upon addition of water to the composition, for the preparation of cells of the deferred action type.

It has heretofore been proposed to provide gelatinous alkaline electrolyte in cells having a zinc anode and a depolarizing copper oxid cathode. Such electrolyte, however, has been made by mixing starch or other gelatinizable material with solutions of caustic alkali. During the period before the cells are put into service corrosion of the zinc and other deleterious actions occur, owing to the contact of the gelatinous electrolyte with the electrodes.

In accordance with the present invention, dry caustic alkali is incorporated with a gelatinizable substance, preferably by grinding the two components together until a high degree of subdivision and an intimate, homogeneous admixture is obtained. The use of coarse and non-uniform mixtures is to be avoided. Slow and incomplete gelatinization and a lumpy product are the usual result of using such mixtures.

A suitable mixture comprises about 20 parts by weight sodium hydroxid and 3 parts corn starch, both ingredients being in dry condition. About 100 parts of water are required for proper gelatinization of this composition. Other caustic alkalies may of course be used, and many materials gelatinizable by the solution of the alkali employed may be substituted for corn-starch. Such are, for example, wheat flour and other cereal substances.

Substantially pure water may be added when it is desired to gelatinize the composition, or aqueous liquids, for example solutions of alkali, may be employed.

The dry composition may be used in connection with any suitable type of cell. This should in general be provided with hermetic sealing means to prevent the deliquescence of the caustic alkali and its reaction with the carbon dioxid of the atmosphere. The cell should also have convenient means for permitting introduction of liquid to the composition.

In some cases the composition may be protected by admixture with a small amount of petroleum oil, by wrapping in moisture-excluding material, or by other suitable means.

The dry electrolyte composition of my invention is inert and cells containing it therefore remain in their original condition until activating liquid is added. Further advantages of the invention resides in the ease of handling the cells in dry condition and their low shipping weight.

Various modifications of the specific procedure described herein may be made without sacrificing the advantages referred to, or departing from the invention as defined in the appended claims.

I claim:

1. A composition for use in preparing electrolyte, comprising a mixture of dry caustic alkali and a material adapted to gelatinize upon addition of water to the composition.

2. A composition for use in preparing electrolyte, comprising dry caustic alkali and a dry cereal substance in intimate admixture therewith.

3. A composition for use in preparing electrolyte, comprising dry sodium hydroxid and starch in intimate admixture therewith.

4. Process of preparing electrolyte, comprising forming a mixture of caustic alkali and a material gelatinizable by alkali solution, and adding an aqueous liquid to the mixture in amount sufficient to produce a gelatinous mass.

5. The invention according to claim 4, in which the alkali and gelatinizable material are ground together until a finely divided, homogeneous mixture is produced.

In testimony whereof, I affix my signature.

GEORGE W. HEISE.